(12) United States Patent
Chatterjee et al.

(10) Patent No.: US 10,945,041 B1
(45) Date of Patent: Mar. 9, 2021

(54) LANGUAGE-AGNOSTIC SUBTITLE DRIFT DETECTION AND LOCALIZATION

(71) Applicant: Amazon Technologies, Inc., Seattle, WA (US)

(72) Inventors: Tamojit Chatterjee, Shyamnager (IN); Mayank Sharma, Bhopal (IN); Muhammad Raffay Hamid, Seattle, WA (US); Sandeep Joshi, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/890,940

(22) Filed: Jun. 2, 2020

(51) Int. Cl.
*H04N 21/47* (2011.01)
*G10L 15/00* (2013.01)
*G10L 15/26* (2006.01)
*H04N 21/488* (2011.01)

(52) U.S. Cl.
CPC .......... *H04N 21/47* (2013.01); *G10L 15/005* (2013.01); *G10L 15/26* (2013.01); *H04N 21/4884* (2013.01); *H04N 21/4888* (2013.01)

(58) Field of Classification Search
CPC ................. H04N 21/4884; H04N 21/8547
USPC .......................................................... 348/468
See application file for complete search history.

(56) References Cited

U.S. PATENT DOCUMENTS

| 6,044,199 | A  * | 3/2000  | Oda ..................... G11B 27/034 348/423.1 |
| 9,319,566 | B2 * | 4/2016  | Kwon ................ H04N 21/4884 |
| 2007/0168864 | A1 * | 7/2007  | Yamamoto ............ G06F 16/739 715/716 |
| 2009/0055189 | A1 * | 2/2009  | Stuart .................... H04H 60/58 704/270 |
| 2014/0278370 | A1 * | 9/2014  | Chen ..................... G06F 40/166 704/9 |
| 2014/0373036 | A1 * | 12/2014 | Phillips ............ H04N 21/42203 725/12 |
| 2015/0082349 | A1 * | 3/2015  | Ishtiaq ............... H04N 21/4884 725/40 |
| 2018/0063593 | A1 * | 3/2018  | Arokiaraj ........... H04N 21/8456 |
| 2020/0051582 | A1 * | 2/2020  | Gilson ............... H04N 21/4307 |

* cited by examiner

*Primary Examiner* — Paulos M Natnael
(74) *Attorney, Agent, or Firm* — Eversheds Sutherland (US) LLP

(57) ABSTRACT

Devices, systems, and methods are provided for language-agnostic subtitle drift detection and localization. A method may include extracting audio from video, dividing the audio into overlapping blocks, and determining the probabilities of overlapping portions of the blocks, the probabilities indicating a presence of voice data represented by the audio in the blocks. The method may generate machine blocks using overlapping portions of blocks where voice data is present, and may map the machine blocks to corresponding blocks indicating that subtitles are available for the video. For mapped blocks, the method may include determining features such as when subtitles are available without voice audio, when voice audio is available without subtitles, and when voice audio and subtitles both are available. Using the features, the method may include determining the probability that the video includes subtitle drift, and the method may include analyzing the video to localize where the subtitle drift occurs.

20 Claims, 8 Drawing Sheets

LANGUAGE-AGNOSTIC SUBTITLE DRIFT DETECTION AND LOCALIZATION

BACKGROUND

Video content is increasingly being produced and formatted in different languages with subtitles and captions. However, subtitles and captions may become out of sync with the corresponding audio that is presented, creating an undesirable experience for a viewer and listener. Some methods of detecting subtitles and captions that are out of sync with audio may be language-dependent, susceptible to errors caused by background noise, and may not account for subtitles and captions in a language that is different than the audio language. Therefore, devices and users may benefit from enhanced subtitle and caption synchronization.

Figure 1:
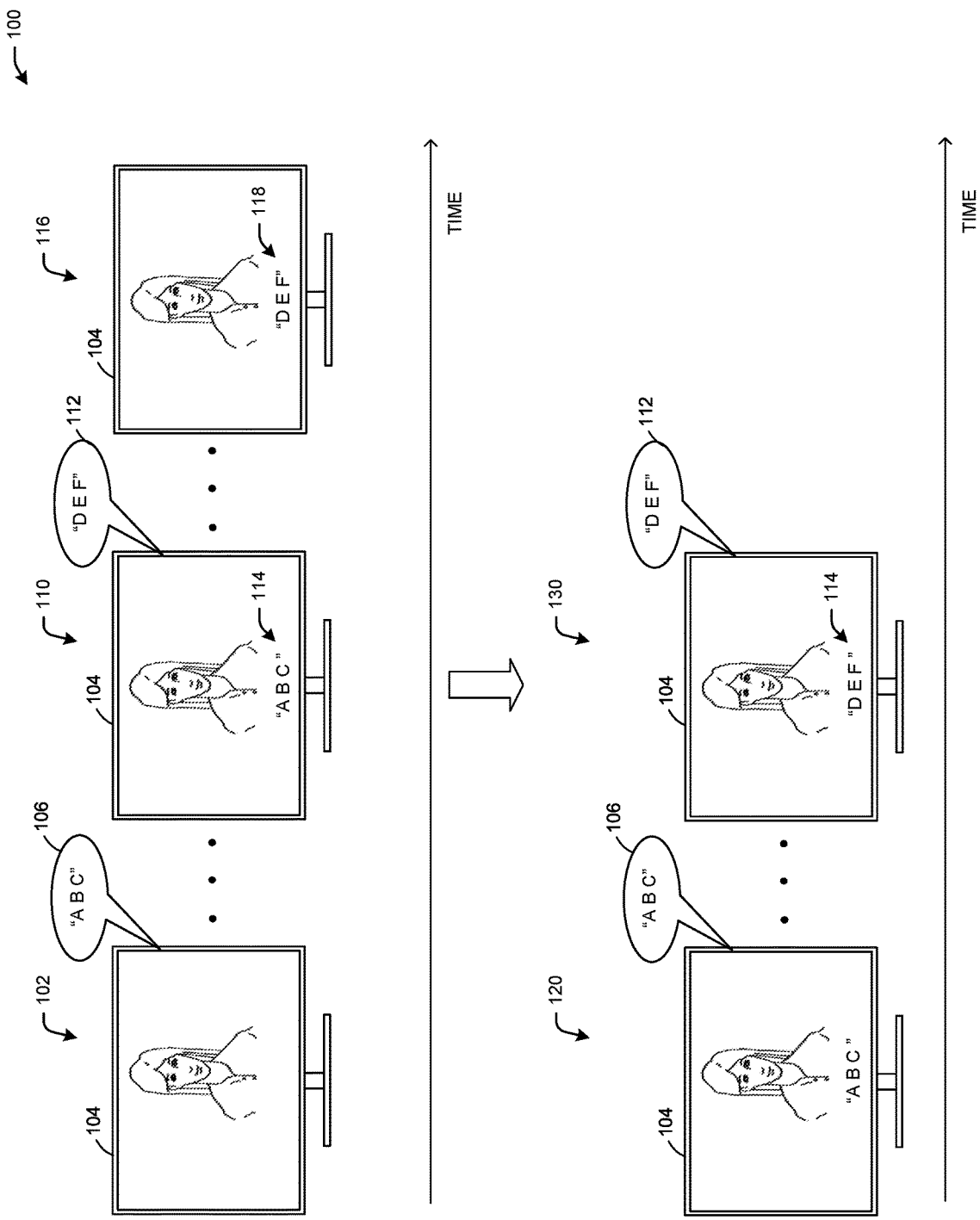
FIG. 1 illustrates an example system for language-agnostic subtitle drift detection and localization, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for language-agnostic subtitle drift detection and localization.

Subtitles and captions (used interchangeably herein) may supplement audio presented in movies, television, and other audio and video mediums and applications. Video may be encoded using a frame rate, but playback of the encoded video may occur at a rate different than the frame rate, resulting in a phenomenon known as drift, in which the displayed subtitles do not correspond (e.g., in time) with the audio. For example, the subtitles may lag behind the audio or may be presented before the corresponding audio is presented. Drift may be the result of other factors as well, such as when frames of video are added or removed (e.g., added or removed scenes) for different versions of the video, such as versions in different countries, theatrical versions, cable movie versions, edited versions, and the like. When video frames are removed from or added to a video, the subtitles may need to be updated to reflect the modification so that subtitles or captions are not presented for removed video frames or so that video frames are not presented without subtitles or with the incorrect subtitles.

Some methods of generating subtitles may use speech recognition. For example, some computer systems may recognize spoken language presented and may translate the spoken language into subtitles. Some speech recognition subtitle methods may be language dependent, affected by background noise (e.g., which may be significant for movies and television), and may not allow for subtitles in a different language than the spoken language of the corresponding content. Some methods of detecting subtitle drift may not be able to identify where, within the video, subtitle drift may occur (e.g., may lack drift localization detection). For example, some cases of drift may start and end within a small region of video (e.g., a few minutes), and some drift detection methods may not distinguish between local and global drift.

Accordingly, systems and users may benefit from enhanced systems, methods, and devices for language-agnostic subtitle drift detection and localization.

In one or more embodiments, subtitle drift detection and localization may be language-agnostic, allowing for the detection of subtitle drift when the subtitles are in a different language than the spoken audio, or when the subtitles are in the same language as the spoken audio. The subtitle drift detection combined with localization of the subtitle drift may detect where (e.g., within a five-minute segment of video) subtitle drift occurs, allowing for efficient mitigation of the drift.

In one or more embodiments, a first method of subtitle drift detection and localization may determine whether a subtitle is synchronized with corresponding spoken audio, and a second method of subtitle drift detection and localization may localize the subtitle drift to a region (e.g., segment) of the corresponding video.

In one or more embodiments, subtitle drift detection and localization may use a voice detector and subtitle guidelines to identify when voices may be presented in video content, and may use subtitles (e.g., provided by human operators and that provide the text that corresponds to the words spoken by the voices in the video content at respective times) may generate machine blocks with start and end times. The machine blocks may be used to detect subtitle drift. For example, for video chunks (e.g., 800 milliseconds), the voice detector may determine the probability that a voice is present in the video. The subtitle drift detection and localization may use smoothing of the audio chunks (blocks) of the video to determine the probability that a voice is present in any smaller increment of time (e.g., 50 milliseconds). For example, a system may overlap (e.g., by 750 milliseconds of overlap) multiple blocks of audio for a video (e.g., 800 millisecond blocks) up to a limit (e.g., 15 overlapping blocks, with a first block at time zero, the next block beginning at 50 milliseconds, the next block beginning at 100 milliseconds, and so on). The probability that any smaller block (e.g., 50 millisecond block) of audio for a video includes spoken audio may be the average probability of the presence of spoken audio in each of the overlapping 800 millisecond blocks. In this manner, when fifteen blocks of 800 milliseconds overlap to create 50 millisecond blocks, and each of the fifteen blocks of 800 milliseconds has a probability of spoken audio, the probability that an overlapped 50 millisecond block includes spoken audio may be an average of the probabilities of the fifteen blocks of 800 milliseconds including spoken audio. The average probability of a 50 millisecond block including spoken audio may be compared to a threshold (e.g., 0.5), above which indicating a likelihood that the 50 millisecond block includes spoken audio, and below which indicating a likelihood that the 50 millisecond block does not include spoken audio. Other video block sizes may be used in the same manner.

In one or more embodiments, a subtitle drift detection and localization system may assign an audio block with a probability at or above the threshold likelihood of including spoken audio a 1 value, and may assign an audio block with a probability below the threshold likelihood of including spoken audio a 0 value. Respective probabilities of overlapping audio blocks for a video including spoken audio may be represented by a vector of 0 and 1 values, such as [0, 1, 1, 1, 1, 0, 0, 0], where each 0 or 1 indicates the likelihood that an audio block (e.g., of 50 millisecond granularity) includes spoken audio. When audio are of length 50 milliseconds, the probability list of [0, 1, 1, 1, 1, 0, 0, 0] may indicate that no spoken audio occurs in the first 50 milliseconds, that spoken audio occurs at a segment beginning at 50 milliseconds and ending at 250 milliseconds, and that no spoken audio occurs after 250 milliseconds through 400 milliseconds of the video (e.g., the movie or television show from which the segments were generated).

In one or more embodiments, a subtitle drift detection and localization system may merge two continuous blocks of probability 1 values for which the amount of time between the continuous blocks is less than a threshold gap of time (e.g., 250 milliseconds) into a single block, and may continue merging blocks as long as the combination of the merged blocks does not exceed a threshold value (e.g., 7000 milliseconds). When a single block has already exceeded the threshold value, the system may not modify the block. The resulting blocks may be referred to as machine-assisted subtitle blocks, or machine blocks.

In one or more embodiments, a subtitle drift detection and localization system may map machine blocks of probability 1 values to a list of blocks (e.g., human blocks) generated from a human-generated subtitle file. For example, human operators may generate human blocks indicating probabilities that subtitles occur in corresponding audio blocks for the same video content used to produce the machine blocks. In this manner, a machine block may refer to a computer-generated block of audio that corresponds to a portion of a video, and for which a probability may indicate the likelihood that audio/voices are presented during the block of video. A human block may refer to a block of audio that corresponds to a portion of the video used to generate the machine block, and during which subtitles for the video are present. For the mapping, n human blocks of probability 1 values may have greater than zero overlap with one or more machine blocks of probability 1 values. Using the mapping, the subtitle drift detection and localization system may determine machine block features such as a start gap (e.g., the start time of a first human block–the start time of a first machine block, representing a time gap from the start of a human block having spoken audio to the time when the overlapping machine block having spoken audio begins), end gap (e.g., the end time of the last human block–the end time of the last machine block, representing a time gap from the end of the human block having spoken audio to the time when the overlapping machine block having spoken audio ends), and overlap percentage (e.g., the percentage of the machine block that is overlapped by a human block). The start and end gaps may indicate times when a voice is present in the audio content for a video, but a subtitle is not present. The overlap percentage may correspond to video where voice and subtitles are both present in the audio, but may not be synchronized. The features may be used to determine summary statistics, which the subtitle drift detection and localization system may use to determine the likelihood of drift occurring anywhere in a video file (e.g., in an entire movie, television episode, etc.).

In one or more embodiments, to localize the drift that may be indicated by the statistics, a subtitle drift detection and localization system may generate a dataset of audio for a video (e.g., with five minute segments), and may introduce drift. For example, drift may be global or local. Global drift may be constant (e.g., x milliseconds of constant drift starting from subtitle block at index i in [N]). To generate a subtitle file with global constant drift, the subtitle drift detection and localization system may sample the drift amount (e.g., x milliseconds) from a drift distribution and a random index i in [N]. The subtitle drift detection and localization system may shift blocks after the ith index by the sampled drift amount. Global drift may be variable, starting at an ith subtitle block and increasing or decreasing linearly. To generate a subtitle file with global variable drift, the subtitle drift detection and localization system may sample an initial drift amount x_0 from a drift distribution, the starting index $i_0 \in [N]$ and the rate of change of drift/second denoted by $r \in [-1, 1]$ from a rate of change distribution. The subtitle drift detection and localization system may shift blocks $j > i_0$ s.t $i_0, j \in [N]$ by an amount d based on the following equation: $d = x_0 + r \times (j-i_0)$ for $j \in [N]$, indicating that the subtitle drift for a block of time is based on a slope of the equation between one block of time and another block of time. The subtitle drift detection and localization system may generate synthetically drifted segments of the video (e.g., 5 minute segments or another length), and may train a machine learning model using the segments. The machine learning model may use the trained model to determine whether subtitle drift occurs in any segment.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example system 100 for language-agnostic subtitle drift detection and localization, in accordance with one or more example embodiments of the present disclosure.

Referring to FIG. 1, the system 100 may include step 102, where a device 104 (e.g., a television or other device capable of presenting video content and subtitles) may present video with spoken audio 106 (e.g., "A B C" as spoken words), and may not present subtitles. At step 110 (e.g., later in time than step 102), the device 104 may present video with spoken audio 112 (e.g., subsequent spoken audio of a same scene or later scene of the video). The spoken audio 112 may include a spoken character string of "D E F." Meanwhile, subtitles 114 presented at step 110 may present a character string representing the text that corresponds to the spoken audio 112. However, instead of the subtitles 114 showing the character string of "D E F" presented by the spoken audio 112, the subtitles 114 may present a character string of "A B C" (or something other than "D E F"), representing out-of-sync subtitles (e.g., drift). In the shown example of step 110, the subtitles 114 may represent a lag in that "A B C" may have been the spoken audio 106 at a previous time for step 102, yet the subtitles 114 at step 110 may show "A B C" as the spoken audio 112. At step 116, the device 104 may present video with not spoken audio 112, and may present subtitles 118. The subtitles 118 may represent the text that corresponds to the spoken audio 112, but may be lagging. In this manner, step 102 may represent a start gap, step 110 may represent overlap, and step 116 may represent an end gap as explained further below.

Still referring to FIG. 1, using enhanced language-agnostic subtitle drift detection and localization, at step 120 the device may preset video with spoken audio 122 (e.g., "A B C" as spoken words), and may present subtitles 124 "A B C" that are synchronized with the spoken audio 122. At a later time, step 130 may include the device presenting video with spoken audio 126 (e.g., "D E F" as spoken words), and with subtitles 128 "D E F" that are synchronized with the spoken audio 126. In this manner, enhanced language-agnostic subtitle drift detection and localization may allow for mitigation of the drift show in step 102 and step 110. In this manner, there may be complete overlap (e.g., no start gap as in step 102 or end gap as in step 116), meaning that there may be no time when voice audio is presented without subtitles, and no time when subtitles are presented without voice audio, thereby indicative of a likelihood of no subtitle drift.

In one or more embodiments, subtitle drift detection and localization may be language-agnostic, allowing for the detection of subtitle drift when the subtitles are in a different language than the spoken audio, or when the subtitles are in the same language as the spoken audio. The subtitle drift detection and localization may identify where (e.g., within a segment of video) subtitle drift may occur, allowing for efficient mitigation of the drift.

In one or more embodiments, a first method of subtitle drift detection and localization may determine whether a subtitle is synchronized with corresponding spoken audio, and a second method of subtitle drift detection and localization may localize the subtitle drift to a region (e.g., segment) of the corresponding video.

In one or more embodiments, subtitle drift detection and localization may use a voice detector and subtitle guidelines (e.g., as explained further below with respect to FIG. 2A) to identify when voices may be presented in audio content for a video. For example, for audio blocks (e.g., 800 milliseconds), the voice detector may determine the probability that a voice is present in the audio for a video. The subtitle drift detection and localization may use smoothing of the audio chunks to determine the probability that a voice is present in any smaller increment of time (e.g., 50 milliseconds). For example, a system may overlap (e.g., by 750 milliseconds of overlap) multiple blocks of audio for a video (e.g., 800 millisecond blocks) up to a limit (e.g., 15 overlapping blocks, with a first block at time zero, the next block beginning at 50 milliseconds, the next block beginning at 100 milliseconds, and so on). The probability that any smaller block (e.g., 50 millisecond block) of audio corresponding to a video includes spoken audio may be the average probability of the presence of spoken audio in each of the overlapping blocks. So, when fifteen blocks of 800 milliseconds overlap to create 50 millisecond blocks, and each of the fifteen blocks of 800 milliseconds has a probability of spoken audio, the probability that an overlapped 50 millisecond block includes spoken audio may be an average of the probabilities of the fifteen blocks of 800 milliseconds including spoken audio. The average probability of a 50 millisecond block including spoken audio may be compared to a threshold (e.g., 0.5), above which indicating a likelihood that the 50 millisecond block includes spoken audio, and below which indicating a likelihood that the 50 millisecond block does not include spoken audio. Other audio block sizes may be used in the same manner.

Figure 2A:
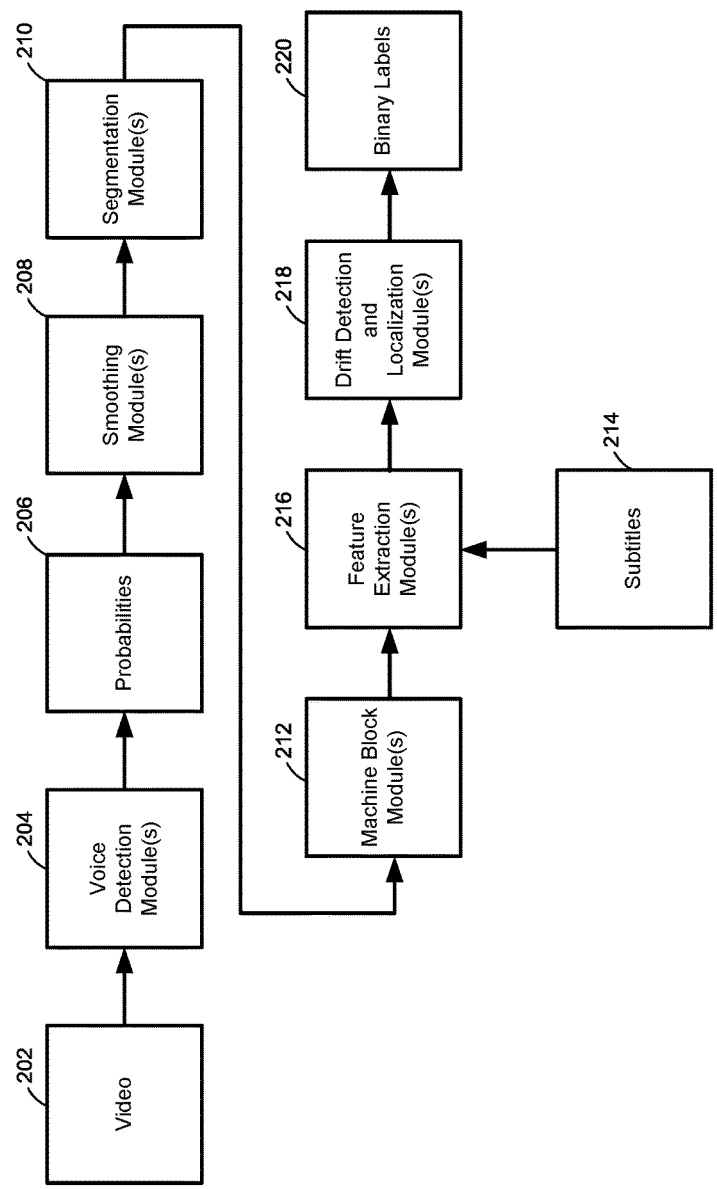
FIG. 2A illustrates an example system for language-agnostic subtitle drift detection and localization, in accordance with one or more example embodiments of the present disclosure.

In one or more embodiments, a subtitle drift detection and localization system, as shown in FIG. 2A, may assign an audio block corresponding to a video with a probability at or above the threshold likelihood of including spoken audio a 1 value, and may assign an audio block corresponding to a video segment with a probability below the threshold likelihood of including spoken audio a 0 value. Respective probabilities of overlapping audio blocks including spoken audio may be represented by a vector of 0 and 1 values, such as [0, 1, 1, 1, 1, 0, 0, 0], where each 0 or 1 indicates the likelihood that an audio block (e.g., of 50 millisecond granularity) includes spoken audio. When audio blocks are of length 50 milliseconds, the probability list of [0, 1, 1, 1, 1, 0, 0, 0] may indicate that no spoken audio occurs in the first 50 milliseconds, that spoken audio occurs at a block beginning at 50 milliseconds and ending at 250 milliseconds, and that no spoken audio occurs after 250 milliseconds through 400 milliseconds of the video (e.g., the movie or television show from which the blocks were generated).

In one or more embodiments, a subtitle drift detection and localization system may merge two blocks of probability 1 values and having less than a threshold gap (e.g., 250 milliseconds) into a single block, and may continue merging blocks as long as the combination of the merged blocks does not exceed a threshold value (e.g., 7000 milliseconds). When a single block has already exceeded the threshold value, the system may not modify the block. The resulting blocks may be referred to as machine-assisted subtitle blocks, or machine blocks.

In one or more embodiments, a subtitle drift detection and localization system, as shown in FIG. 2A, may map machine blocks of probability 1 values to a list of blocks generated from a human-generated subtitle file. For example, human operators may generate human blocks indicating that subtitles are presented for audio blocks corresponding to the same video content used to produce the machine blocks. For the mapping, n human blocks may have greater than zero overlap with one or more machine blocks of probability 1 values. Using the mapping, the a subtitle drift detection and localization system may determine machine block features such as a start gap (e.g., the start time of a first human block–the start time of a first machine block, representing a time gap from the start of a human block having subtitles to the time when the overlapping machine block having spoken audio begins), end gap (e.g., the end time of the last human block–the end time of the last machine block, representing a time gap from the end of the human block having subtitles to the time when the overlapping machine block having spoken audio ends), and overlap percentage (e.g., the percentage of the machine block that is overlapped by a human block). The end gaps may indicate times when a voice is present in the audio content for a video, but a subtitle is not present. The start gaps may indicate times when subtitles are present in the audio content, but audio/voices are not present in the video content. The overlap percentage may correspond to audio where voice and subtitles are both present in the audio, but may not be synchronized. The features may be used to determine summary statistics, which the subtitle drift detection and localization system may use to determine the likelihood of drift occurring anywhere in a video file (e.g., in an entire movie, television episode, etc.).

In one or more embodiments, to localize the drift that may be indicated by the statistics, a subtitle drift detection and localization system, as shown in FIG. 2A, may generate a dataset of video (e.g., with five minute segments), and may introduce drift. For example, drift may be global or local. Global drift may be constant (e.g., x milliseconds of constant drift starting from subtitle block at index i in [N]). To generate a subtitle file with global constant drift, the subtitle drift detection and localization system may sample the drift amount (e.g., x milliseconds) from a drift distribution and a random index i in [N]. The subtitle drift detection and localization system may shift blocks after the ith index by the sampled drift amount. Global drift may be variable, starting at an ith subtitle block and increasing or decreasing linearly. To generate a subtitle file with global variable drift, the subtitle drift detection and localization system may sample an initial drift amount x_0 from a drift distribution, the starting index $i_0 \in [N]$ and the rate of change of drift/second denoted by $r \in [-1, 1]$ from a rate of change distribution. The subtitle drift detection and localization system may shift blocks $j > i_0$ s.t $i_0, j \in [N]$ by an amount d based on the following equation: $d = x_0 + r \, x(j - i_0)$ for $j \in [N]$, indicating that the subtitle drift for a block of time is based on a slope of the equation between one block of time and another block of time. The subtitle drift detection and localization system may generate synthetically drifted segments of the video (e.g., 5 minute segments or another length), and may train a machine learning model using the segments. The machine learning model may use the trained model to determine whether subtitle drift occurs in any segment.

In one or more embodiments, the spoken audio 106, the spoken audio 112, the spoken audio 122, and the spoken audio 126 may represent the audio heard by a listener during video playback using the device 104. The spoken audio may be presented by the same device that presents the corresponding video (e.g., spoken dialog of characters represented by a movie, television show, or other type of video), or the spoken audio may be presented using another audio output, such as one or more speakers separate and physically distinct from the device 104 (e.g., a sound bar, surround sound speakers, headphones, etc.—not shown). The subtitles 108, the subtitles 114, the subtitles 124, and the subtitles 128 may represent text displayed by the device concurrently with the video whose spoken audio is represented by the subtitles. The subtitles may be seen by a viewer, and may serve as a textual output that represents spoken dialog in the displayed video.

In one or more embodiments, the device 104 may include a personal computer (PC), a smart home device, a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a Blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

FIG. 2A illustrates an example system 200 for language-agnostic subtitle drift detection and localization, in accordance with one or more example embodiments of the present disclosure.

Referring to FIG. 2A, the system 200 includes one or more modules for performing language-agnostic subtitle drift detection and localization. Video 202 (e.g., video content, such as video frames, segments, etc. representing a television show, movie, video clip, etc.) may be analyzed by one or more voice detection modules 204. The one or more voice detection modules 204 may determine the probability that speech occurs (e.g., based on execution of the video 202) in any audio for the video 202. For example, the one or more voice detection modules 204 may determine a probability that a voice is present in audio for the video 202, and the voice may be indicative of a presence of speech. The system may determine and assign probabilities 206 (e.g., probability data indicating the likelihood that blocks of the video 202 have speech) to blocks of the video 202. One or more smoothing modules 208 of the system 200 may apply a smoothing technique (e.g., as explained further herein with regard to FIG. 2B) to the audio for the video 202 to allow the system 200 to estimate the probability of speech occurring in the video 202 at a more granular time range (e.g., 50 millisecond portions of the video 202). In this manner, the system 200 may estimate the respective probability of a portion of audio for the video 202 by determining an average probability of speech of any overlapping portions of audio for the video 202 as explained further herein. One or more segmentation modules 210 of the system may divide the video 202 into segments (or blocks). Based on the probabilities of speech for the video 202, one or more machine block modules 212 of the system 200 may generate machine-assisted subtitle blocks (e.g., machine blocks) as explained further below.

Still referring to FIG. 2A, once machine blocks are generated by the one or more machine block modules 212, the machine blocks and subtitles 214 (e.g., human-operator generated blocks of the video 202 indicating whether speech is present in audio for the video 202) may be analyzed by one or more feature extraction modules 216. For example, the one or more feature extraction modules 216 may map N machine blocks to a list of blocks represented by the subtitles 214 (e.g., a list of blocks of the video 202 in a human-operator generated subtitle file). Based on the mapping, as explained further herein, the one or more feature extraction modules 216 may determine features for any machine block. The features may include a start gap (e.g., the start time of a first human block–the start time of a first machine block, representing a time gap from the start of a human block having spoken audio to the time when the overlapping machine block having spoken audio begins), end gap (e.g., the end time of the last human block–the end time of the last machine block, representing a time gap from the end of the human block having spoken audio to the time when the overlapping machine block having spoken audio ends), and overlap percentage (e.g., the percentage of the machine block that is overlapped by a human block). The start and end gaps may indicate times when a voice is present in audio for the video 202, but a subtitle is not present. The overlap percentage may correspond to audio where voice and subtitles are both present in the video 202, but may not be synchronized. Based on the features, one or more drift detection and localization models 218 (e.g., one or more machine learning models used to detect the presence of drift and to localize the detected drift) may determine the probability of subtitle drift occurring in the video 202 (e.g., the entire video file represented by the video 202). The one or more drift detection and localization models 218 may output binary labels 220 that indicate the drift occurs or does not occur. The binary labels 220 may be used to train the one or more drift detection and localization models 218 to identify when the video 202 is likely to include subtitle drift. The system 200 may analyze the video 202 to determine whether subtitle drift is likely to occur in the video 202 (e.g., a binary label indicating drift occurs or does not occur). Given the probability of drift in the video 202, the one or more drift detection and localization models 218 may localize the audio for the video 202 to determine where (e.g., within a 5-minute portion of the video 202) the subtitle drift occurs (e.g., within a larger portion than was analyzed for drift detection).

In one or more embodiments, the system 200 may determine probabilities of overlapping audio blocks including spoken audio may be represented by a vector of 0 and 1 values, such as [0, 1, 1, 1, 1, 0, 0, 0], where each 0 or 1 indicates the likelihood that an audio block (e.g., of 50 millisecond granularity) includes spoken audio. So, when audio blocks are of length 50 milliseconds, the probability list of [0, 1, 1, 1, 1, 0, 0, 0] may indicate that no spoken audio occurs in the first 50 milliseconds, that spoken audio occurs at a segment beginning at 50 milliseconds and ending at 250 milliseconds, and that no spoken audio occurs after 250 milliseconds through 400 milliseconds of audio for the video (e.g., the movie or television show from which the segments were generated).

In one or more embodiments, the one or more machine block modules 212 may merge two blocks of probability 1 values and having less than a threshold gap (e.g., 250 milliseconds) into a single block, and may continue merging blocks as long as the combination of the merged blocks does not exceed a threshold value (e.g., 7000 milliseconds). When a single block has already exceeded the threshold value, the one or more machine block modules 212 may not modify the block.

In one or more embodiments, the one or more drift detection and localization models 218 may determine statistics based on the features for the machine blocks. The start gaps, end gaps, and overlap percentages for the machine blocks of audio for the video 202 may be analyzed for mean start gaps, mean end gaps, mean overlap percentage, etc. For example, the statistics may include a mean, median, standard deviation, minimum, maximum, X percentile, Y percentile, etc., resulting in a number of features per machine block (e.g., 39 features or another number). The statistics may include a percentage of machine blocks having no mapping to a human block. The result may be a 40x1 vector of statistical values per machine block of the video 202. The vectors may be provided to the one or more drift detection and localization models 218, which may determine the probability of drift occurring in the video 202. An example of the performance of the one or more drift detection and localization models 218 on pairs of video and subtitles trained on video and subtitle pairs is shown below in Table 1.

TABLE 1

Drift Probability Statistics.

| | Precision | Recall | F1-Score | Support |
|---|---|---|---|---|
| Testing Statistics | | | | |
| No-Drift | 0.93 | 0.93 | 0.93 | 1135 |
| Drift | 0.94 | 0.94 | 0.94 | 1270 |
| Accuracy | X | X | 0.94 | 2405 |
| Macro Average | 0.94 | 0.94 | 0.94 | 2405 |
| Weighted Average | 0.94 | 0.94 | 0.94 | 2405 |
| Training Statistics | | | | |
| No-Drift | 1.0 | 1.0 | 1.0 | 3405 |
| Drift | 1.0 | 1.0 | 1.0 | 3809 |
| Accuracy | X | X | 1.0 | 7214 |
| Macro Average | 1.0 | 1.0 | 1.0 | 7214 |
| Weighted Average | 1.0 | 1.0 | 1.0 | 7214 |

Table 1 shows the performance of the one or more drift detection and localization models 218 on a dataset of video and subtitle pairs (e.g., over 2000 pairs). The precision, recall, and f1-score represent metrics indicating the quality of performance of the drift detection model. The training statistics represent the performance of the one or more drift detection and localization models 218 on the training data. The performance on the testing statistics may be reported to determine a likelihood of subtitle drift in the video 202. By tuning the hyperparameters of the drift detection model used to classify the video 202, the one or more drift detection and localization models 218 may produce the values in Table 1. Due to a lack of availability of high-quality synchronized video and subtitles pairs—which may be required to generate a training dataset for the one or more drift detection and localization models 218—the system 200 may use a smaller and cleaner dataset.

In one or more embodiments, to generate a modified dataset for training the one or more drift detection and localization models 218, the system 200 may introduce subtitle drift by selecting an audio block in the video 202, and then shifting all the blocks after the selected block by a sampled amount. The system 200 may segment audio for the video 202 into audio segments (e.g., of 5 minutes or another duration), and then introduce drift into the segments. For one portion of the segments (e.g., 90%), the system 200 may introduce drift for all blocks in a segment. For another portion of the segments (e.g., 10%), the system 200 may introduce drift to all blocks following any selected segments. In this manner, the system 200 may determine a smaller and cleaner dataset to train the one or more drift detection and localization models 218.

In one or more embodiments, once the system 200 has determined that the video 202 is likely to include subtitle drift (e.g., as indicated by a binary label), the system 200 may segment the video 202 into larger blocks (segments) than were used to determine whether the video 202 includes subtitle drift. For localization of the subtitle drift, the system 200 may analyze overlapping blocks of audio for any segment, and may generate machine blocks based on the average probabilities of subtitle drift occurring in any overlapping blocks of a segment. Using mapping between machine blocks and human blocks as described above, the system 200 may determine statistics used to estimate whether a segment of the video 202 includes subtitle drift. In this manner, the system 200 may use the process used to detect subtitle drift in the video 202 to localize the subtitle drift by analyzing larger segments of the video 202 once the system 200 determines that the video 202 includes subtitle drift.

In one or more embodiments, the system 200 may include a personal computer (PC), a smart home device, a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a Blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

Figure 2B:
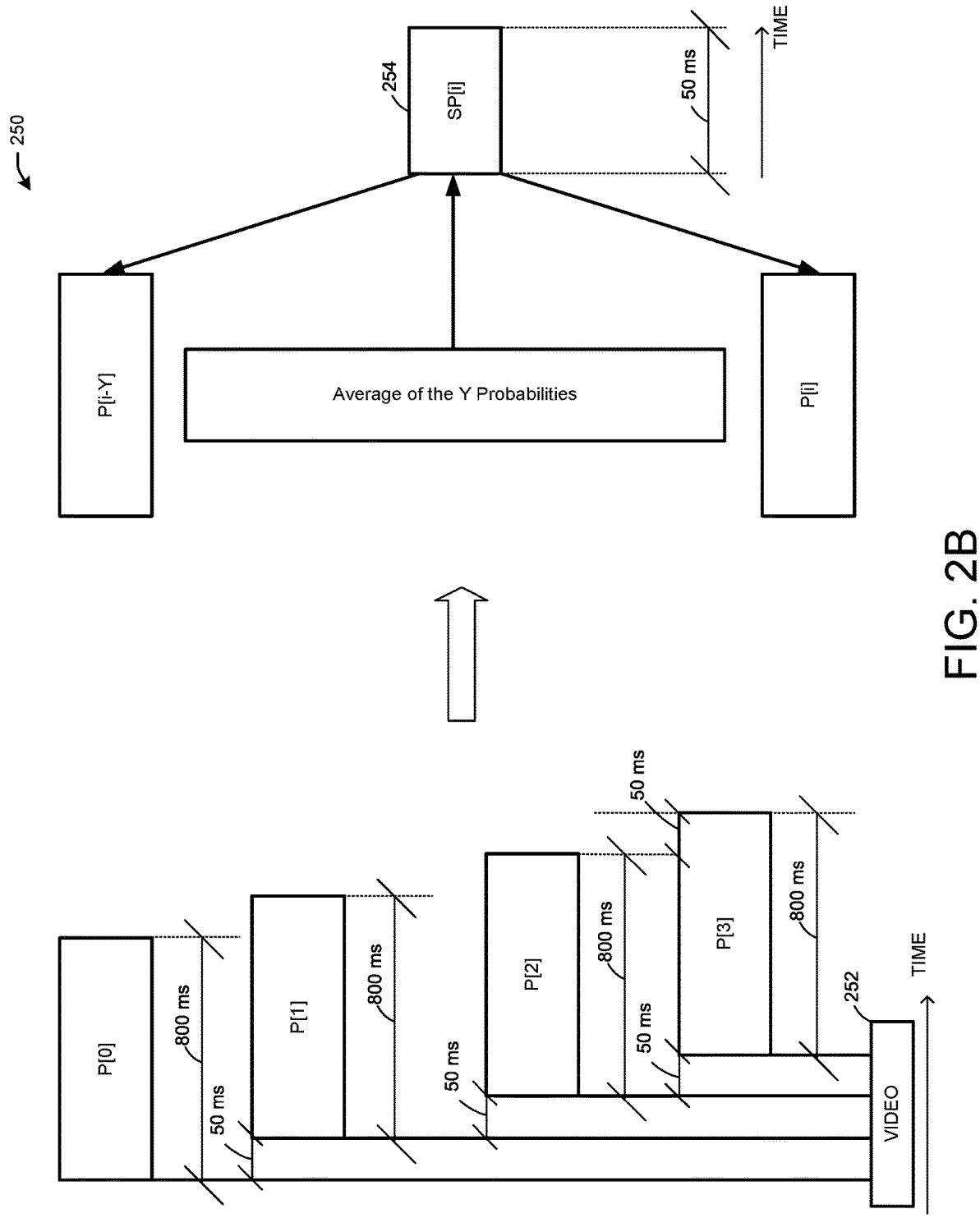
FIG. 2B illustrates an example process for language-agnostic subtitle drift detection and localization, in accordance with one or more example embodiments of the present disclosure.

FIG. 2B illustrates an example process 250 for language-agnostic subtitle drift detection and localization, in accordance with one or more example embodiments of the present disclosure.

Referring to FIG. 2B, the process 250 generates probability blocks (e.g., using the one or more machine block modules 212 of FIG. 2A). Audio for a video 252 may be sampled by the system 200 of FIG. 2A and divided into 800 millisecond clips (e.g., blocks). The system 200 of FIG. 2A may generate an overlapping with one or more overlapping portions of the clips. Overlapping clips may have 750 milliseconds of overlap. For example, a clip of 800 milliseconds may begin at time t0 (e.g., a clip associated with probability P[0] indicating whether the clip includes audio representing speech/voice). At time t0+50 milliseconds, another 800 millisecond clip (e.g., a clip associated with probability P[1] indicating whether the clip includes audio representing speech/voice) may overlap the first clip by 750 milliseconds (e.g., the first 50 milliseconds of the first clip may not be overlapped, and the remaining 750 milliseconds of the first clip may be overlapped by the first 750 milliseconds of the second clip), and so on, resulting in a first 50 millisecond portion that is not overlapped, a last 50 millisecond portion that is not overlapped, and multiple 50 millisecond portions overlapped. In this manner, some 50 millisecond portions may have no overlap (e.g., the first and last portions of the video 252), some 50 millisecond portions may have overlap of two 800 millisecond portions, and some 50 millisecond portions may have overlap of more than two 800 millisecond portions.

In one or more embodiments, the system 200 of FIG. 2A may apply a smoothing technique to the overlapping audio portions to estimate the probability SP[i] of an ith 50 millisecond clip formed by the overlapping. SP[i] may refer to a probability of speech occurring in a 50 millisecond block created by one or more of the 800 millisecond blocks. SP[i] may be based on the average of the Y probabilities for the Y blocks of 800 milliseconds of the video 252 that correspond to the ith 50 millisecond block of the 800 millisecond blocks. For example, the first 50 milliseconds of audio for the video 252 may have no overlap, and therefore the probability of the first 50 milliseconds of audio for the video 252 having speech/voice present may be the probability P[0] (e.g. Y=1). The second 50 milliseconds of audio for the video 252 may have overlap of the first 800 millisecond block and the second 800 millisecond block (e.g., Y=2), and the probability of the second 50 milliseconds of audio for the video 252 having speech/voice present may be an average of P[0] and P[1], and so on for the subsequent 50 millisecond portions using probability P[0] for the first 800 millisecond block, probability P[1] for the second 800 millisecond block, probability P[2] for the third 800 millisecond block, probability P[4] for the fourth 800 millisecond block, and so on. In this manner, if P[0] is the probability for the first 800 milliseconds of audio for the video 252, then the probability of speech/voice occurring for the first 50 milliseconds of audio for the video 252 is P[0]. For any 50 millisecond portion that is overlapped by two or more 800 millisecond portions, the probability of the 50 millisecond portion may be an average of the 800 millisecond portions that overlap to form the 50 millisecond portion.

In one or more embodiments, the resulting probability of the 50 millisecond clips may be represented by a probability list (e.g., vector) in which respective entries indicate a 1 or 0 for whether the respective 50 millisecond clip is likely to include speech. For example, a probability list of [0, 1, 1, 1, 1, 0, 0, 0] may indicate that a first 50 millisecond clip does not have speech, that a next 50 millisecond clip has speech, and so on.

In one or more embodiments, while FIG. 2B refers to 800 millisecond clips (blocks) and 50 millisecond clips (blocks) that are formed by overlapping the 800 millisecond clips, the audio for the video 252 may be segmented into blocks of other durations, and the overlapping may be generated in different intervals than 50 milliseconds. The 800 millisecond and 50 millisecond quantities are examples and are not meant to be limiting.

Figure 3A:
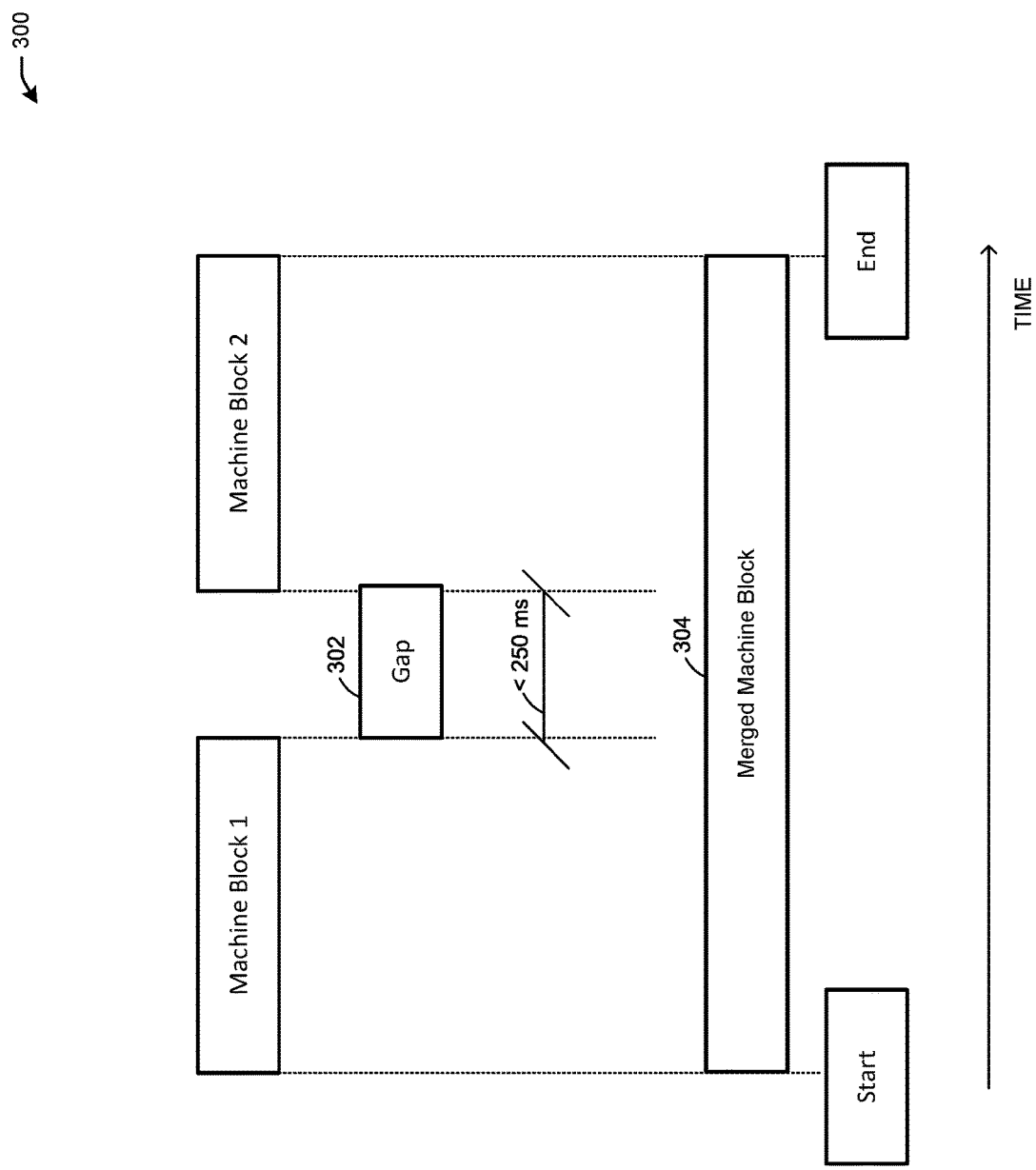
FIG. 3A illustrates an example process for language-agnostic subtitle drift detection and localization, in accordance with one or more example embodiments of the present disclosure.

FIG. 3A illustrates an example process 300 for language-agnostic subtitle drift detection and localization, in accordance with one or more example embodiments of the present disclosure.

Referring to FIG. 3A, the process 300 shows the merging of machine blocks (e.g., as performed by the one or more machine block modules 212 of FIG. 2A). As shown in FIG. 3A, the system 200 of FIG. 2A may merge two machine blocks (e.g., machine block 1 and machine block 2) when a gap 302 between the machine blocks is less than a threshold amount of time (e.g., 250 milliseconds as shown, or another threshold time). Using the example of the probability list of [0, 1, 1, 1, 1, 0, 0, 0], one machine block (e.g., machine block 1) may be generated from 50 milliseconds to 200 milliseconds of audio for the video 252 of FIG. 2B. In this manner, machine block 1 may include a portion of audio for the video 252 of FIG. 2B beginning at 50 milliseconds and ending at 200 milliseconds (e.g., the 50 millisecond portions of audio for the video 252 that have 1 values in the probability list). Therefore, machine block 1 may be 150 milliseconds in duration. When a subsequent machine block (e.g., machine block 2) occurs within the gap 302 (e.g., less than a threshold time from the end time of audio for the video represented by machine block 1), the system 200 may merge machine block 1 and machine block 2, resulting in the merged machine block 304. The merged machine block 304 may include other machine blocks (not shown), such as a third machine block (not shown) when the other machine blocks also begin within the gap 302 time from the end of the machine block 1. In this manner, merging of machine blocks may continue unless a combined machine block (e.g., the merged machine block 304) is within a threshold amount of time. For example, once a machine block exceeds a duration of 7000 milliseconds, no additional machine blocks may be merged with the machine block of 7000 milliseconds or longer.

Figure 3B:
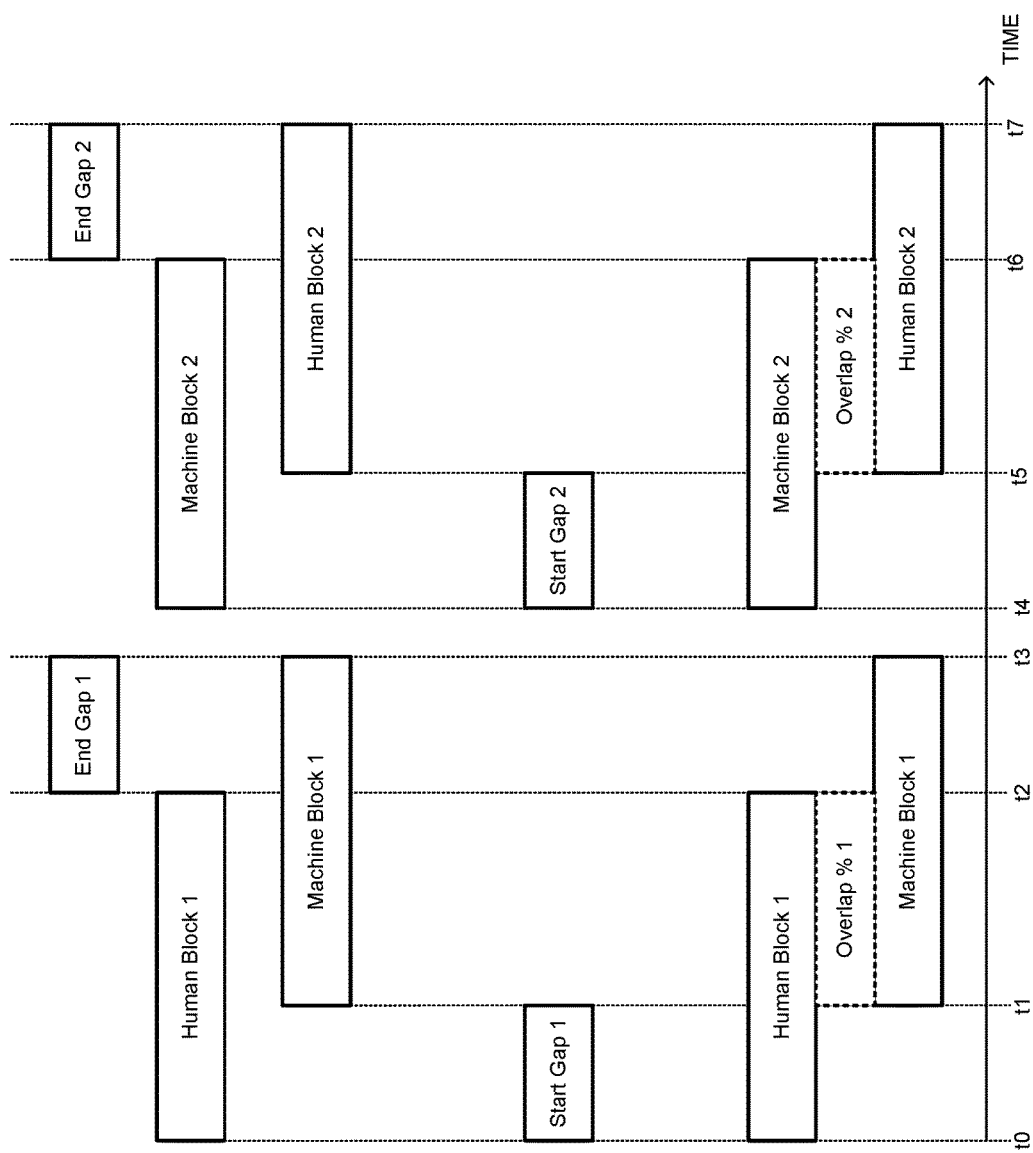
FIG. 3B illustrates an example process for language-agnostic subtitle drift detection and localization, in accordance with one or more example embodiments of the present disclosure.

FIG. 3B illustrates an example process 350 for language-agnostic subtitle drift detection and localization, in accordance with one or more example embodiments of the present disclosure.

Referring to FIG. 3B, the process 350 may include mapping machine blocks where speech has been determined to be present to human-generated subtitle files (e.g., human blocks) where subtitles have been determined to be present. The mapping may be a function of the one or more feature extraction modules 216 of FIG. 2A. For example, machine block 1 of FIG. 3A may map to human block 1, and machine block 2 of FIG. 3A may map to human block 2. As shown in FIG. 3B, a first human block (e.g., human block 1) may start at time t0, and machine block 1 from FIG. 3A may begin at a later time of t1 (e.g., 50 milliseconds). Because human block 1 and machine block 1 refer to the same video (e.g., the video 252 of FIG. 2B), start gap 1 (e.g., the time between time t0 and time t1) may refer to a time when a human operator has indicated (e.g., using human block 1) that subtitles occur, but when the system 200 of FIG. 2A has indicated that no speech/voice occurs. Human block 1 and machine block 1 may overlap from time t1 (e.g., when the machine block 1 begins) to time t2 (e.g., when the human block 1 ends). The overlapping time of human block 1 and machine block 1 may indicate a time when a human operator has indicated that a subtitles are present in audio for the video, and when the system 200 has indicated that speech/voice occur in audio for the video, but the speech/voice and the subtitles may not be synchronized. Machine block 1 may end at time t3, after time t2 when the human block 1 ends, so end gap 1 may be indicative of a time (e.g., from time t2 to time t3) when a human operator has indicated that no subtitles are present in audio for the video, and when the system 200 has determined that speech/voice is present in audio for the video. The system 200 may determine an overlap percentage 1 (e.g., overlap % 1) as the percentage of machine block 1 that is overlapped by human block 1. The system 200 may determine the start gap 1 time and the end gap 1 time. The overlap percentage 1 may refer to (t2-t1)/(t3-t1). The overlap percentage 1, the start gap 1, and the end gap 1 may be referred to as features for the machine block 1.

Still referring to FIG. 3B, a second machine block (e.g., machine block 2 from FIG. 3A) may start at time t4, and second human block (e.g., human block 2) may begin at a later time of t5. Because human block 2 and machine block 2 refer to the same video (e.g., the video 252 of FIG. 2B), start gap 2 (e.g., the time between time t4 and time t5) may refer to a time when a human operator has indicated (e.g., using human block 2) that no subtitles occur, but when the system 200 of FIG. 2A has indicated that speech/voice is present. Human block 2 and machine block 2 may overlap from time t5 (e.g., when human block 2 begins) to time t6 (e.g., when machine block 2 ends). The overlapping time of human block 2 and machine block 2 may indicate a time when a human operator has indicated that subtitles are present in audio for the video, and when the system 200 has indicated that speech/voice is present in audio for the video. Human block 2 may end at time t7, after time t6 when machine block 1 ends, so end gap 2 may be indicative of a time (e.g., from time t6 to time t7) when a human operator has indicated that subtitles are present in audio for the video, and when the system 200 has determined that speech/voice is not present in audio for the video. The system 200 may determine an overlap percentage 2 (e.g., overlap % 2) as the percentage of machine block 2 that is overlapped by human block 2. The overlap percentage 2 may refer to (t6-t5)/(t7-t5). The system 200 may determine the start gap 2 time and the end gap 2 time. The overlap percentage 2, the start gap 2, and the end gap 2 may be referred to as features for the machine block 2. In this manner, start and end gaps may refer to times when speech/voice is determined by the system 200 of FIG. 2A as present, but human blocks indicate that no subtitles are presented, or to times when speech/voice is determined by the system 200 of FIG. 2A to not be present, but human blocks indicate that subtitles are present. When the overlap percentage is 100 for a machine block, then there should be no time when subtitles are present without speech/voice audio, and no time when speech/voice audio is present without subtitles throughout the duration of the machine block, thereby indicating a likelihood of no subtitle drift during that time.

In one or more embodiments, the system 200 of FIG. 2A may determine for N machine blocks the N start gap values (e.g., [start gap 1, start gap 2, . . . , start gap N]), the N end gap values (e.g., [end gap 1, end gap 2, . . . , end gap N]), and the N overlap percentages (e.g., [overlap percentage 1, overlap percentage 2, . . . , overlap percentage N]). The statistics (e.g., quantitative measurements) may represent the mean start gap, mean end gap, mean overlap percentage, median start gap, median end gap, median overlap percentage, minimum and maximum start gaps/end gaps/overlap percentages, X and Y percentiles of the values, and the like for the N machine blocks. The result may be a 40x1 vector for any pair of video and corresponding subtitle file(s). A vector may be provided to the one or more drift detection and localization models 218 of FIG. 2A, which may determine the probability of drift occurring in the video 202 of FIG. 2A.

In one or more embodiments, while not shown, machine blocks may map to multiple human blocks. Such mapping may occur when a first human block to which a machine block maps concludes before a machine block ends, and when a second human block to which the machine block maps ends concludes before the machine block ends. In this manner, a start gap may depend on the first human block that maps to a machine block (e.g., an earliest human block in terms of a time in a video) and the machine block, an end gap may be based on the machine block and the last human block (e.g., in terms of time in the video), and the overlap percentage of the machine block may refer to the percentage of the machine block that is overlapped by the multiple human blocks to which the machine block maps.

Figure 4:
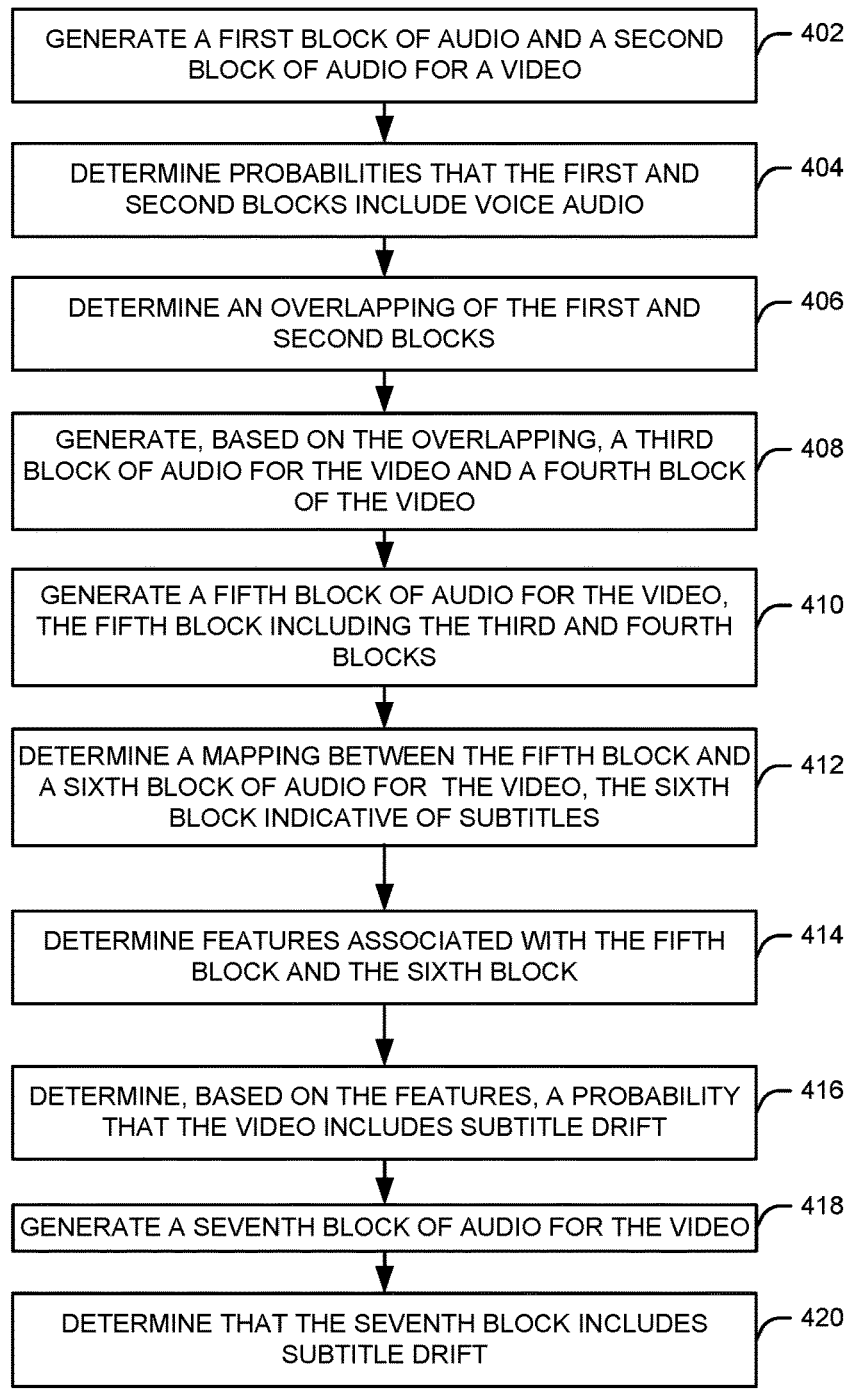
FIG. 4 illustrates an example flow diagram for a process for language-agnostic subtitle drift detection and localization, in accordance with one or more example embodiments of the present disclosure.

FIG. 4 illustrates an example flow diagram for a process 400 for language-agnostic subtitle drift detection and localization, in accordance with one or more example embodiments of the present disclosure.

At block 402, a system (e.g., the system 200 of FIG. 2A) may generate blocks of audio for video, including first and second audio blocks (e.g., the 800 millisecond blocks of the video 252 shown in FIG. 2B). The system may extract audio from video sampled at a sampling frequency (e.g., 48 KHz or another frequency), and may divide the extracted audio into the audio blocks of equal length.

At block 404, the system may determine probabilities that the first and second blocks of audio for the video include audio data representative of a voice or speech. For example, for any of the blocks generated at block 402, the system may determine the probability that a block includes audio data representative of a voice or speech (e.g., a listener when listening to a block would hear someone speaking). In this manner, the system may determine a first probability that the first block includes audio data representative of a voice or speech, and may determine a second probability that the second block includes audio data representative of a voice or speech. The probability values may range from 0-1 (e.g., 0% to 100%).

At block 406, the system may determine an overlapping of the blocks generated at block 402. For example, the first block may begin at time zero (e.g., the beginning of the video to which the first block corresponds) and may have a duration of 800 milliseconds. The second block may begin at 800 milliseconds into the video to which the second block corresponds. After an incremental time, such as every 50 milliseconds, one block generated at block 402 may overlay (e.g., overlap) another block beginning at the incremental time. In this manner, the second block may overlay the first block beginning at 50 milliseconds into the video so that the first 50 milliseconds of the first block is not overlapped, the remaining 750 milliseconds of the first block is overlapped by the second block, and the final 50 milliseconds of the second block is not overlapped by the first block. Another block generated at block 402 may overlap the second block beginning at 50 milliseconds into the second block (e.g., 100 milliseconds into the first block and into the video). In this manner, the first 50 milliseconds of the second block may be overlapped only by the first block, and the remaining 750 milliseconds of the second block may be overlapped by the other block. The remaining blocks generated at block 402 may continue to overlap every 50 milliseconds in this manner, thereby resulting in the first 50 milliseconds and the last 50 milliseconds not overlapped, and the 50 millisecond blocks in between the first and last 50 milliseconds overlapped by multiple 800 millisecond blocks.

At block 408, the system may generate a third block of audio for the video and a fourth block of audio for the video based on the overlapping of the 800 millisecond blocks of block 406. For example, the third and fourth blocks of audio may refer to the 50 millisecond blocks formed by the overlapping of the 800 millisecond blocks every 50 milliseconds as described at block 406. Because the third and fourth blocks may include 50 millisecond portions of one or multiple 800 millisecond blocks based on the overlapping, the system may evaluate the probability that any 50 millisecond block includes audio data representative of a voice or speech. For a 50 millisecond block that comes from an 800 millisecond block and is not overlapped in the overlapping, the probability that the 50 millisecond block includes audio data representative of a voice or speech may be the probability that the 800 millisecond block, of which the 50 millisecond block is a part, includes audio data representative of a voice or speech. When a 50 millisecond block is part of two or more overlapping 800 millisecond blocks, the system may determine the average probability of the probabilities for the respective 800 millisecond blocks of which the 50 millisecond block is a part, and may assign the average probability to the 50 millisecond block. The probabilities of the 50 millisecond blocks formed by the overlapping may be compared to a threshold probability (e.g., 0.5). When a probability of a 50 millisecond block having audio data representative of a voice or speech meets or exceeds the threshold probability, the system may assign the 50 millisecond block a value of 1. When a probability of a 50 millisecond block having audio data representative of a voice or speech fails to exceed the threshold probability, the system may assign the 50 millisecond block a value of 0. The 0 and 1 values assigned to the 50 millisecond blocks may form a probability list (e.g., a vector) such as [0, 1, 1, 1, 0].

At block 410, the system may generate a fifth block of audio for the video, the fifth block including the third and fourth blocks (e.g., 50 millisecond blocks formed from the overlapping of the 800 millisecond blocks). Any consecutive 1 values of the probability list may be combined into a machine block with a start time corresponding to the first 1 value of the consecutive 1 values, and an end time corresponding to the last consecutive 1 value. In the example vector of [0, 1, 1, 1, 0], the "1, 1, 1," values may indicate the presence of speech/voice audio in a 50 millisecond block beginning at 50 milliseconds into a video (e.g., after the first 50 milliseconds for which there is a "0" value), the presence of speech/voice audio in a 50 millisecond block beginning at 100 milliseconds into the video (e.g., after the second 50 milliseconds, for which the value is a "1"), and the presence of speech/voice audio in a 50 millisecond block beginning at 150 milliseconds into the video (e.g., after the third 50 milliseconds, for which the value is a "1"). In this manner, the system may combine multiple consecutive 50 millisecond blocks into the fifth block. When the third and fourth blocks are consecutive blocks with probability list values of "1," the system may combine the third and fourth blocks into the fifth block as a machine block. When the system identifies multiple machine blocks based on the 50 millisecond blocks having probability list values of "1," the system may merge machine blocks (e.g., as shown in FIG. 3A) when the time gap between respective machine blocks is less than a threshold amount of time (e.g., 250 milliseconds).

At block 412, the system may determine a mapping between the fifth block and one or more additional blocks (e.g., human blocks), which may include a sixth block. The sixth blocks (and any human blocks) may represent times during the same video used to generate the audio blocks when subtitles are presented. The mapping may allow the system to compare machine blocks to human blocks at or near the same times of the video to determine whether there are times when subtitles are present without speech/voice audio, whether speech/voice audio is present without subtitles, and/or whether speech/voice audio is present with subtitles. The mapping and related stop gaps, end gaps, and overlap percentage are shown in FIG. 3B.

At block 414, the system may determine features associated with the fifth block and the sixth block (or to any one or more human blocks to which the machine block maps). The features for a machine block may include a start gap (e.g., the start time of a first human block–the start time of a first machine block, representing a time gap from the start of a human block having subtitles to the time when the overlapping machine block having spoken audio begins), end gap (e.g., the end time of the last human block–the end time of the last machine block, representing a time gap from the end of the human block having subtitles to the time when the overlapping machine block having spoken audio ends), and overlap percentage (e.g., the percentage of the machine block that is overlapped by a human block). The end gaps may indicate times when a voice is present in the audio content for a video, but a subtitle is not present. The start gaps may indicate times when subtitles are present in the audio content, but audio/voices are not present in the video content. The overlap percentage may correspond to audio where voice and subtitles are both present in the audio, but may not be synchronized. The features may be used to determine summary statistics, which the subtitle drift detection and localization system may use to determine the likelihood of drift occurring anywhere in a video file (e.g., in an entire movie, television episode, etc.).

At block 416, the system may determine statistics indicating the likelihood of drift occurring anywhere in a video file (e.g., in an entire movie, television episode, etc.). The system may determine for N machine blocks the N start gap values (e.g., [start gap 1, start gap 2, . . . , start gap N]), the N end gap values (e.g., [end gap 1, end gap 2, . . . , end gap N]), and the N overlap percentages (e.g., [overlap percentage 1, overlap percentage 2, . . . , overlap percentage N]). The statistics (e.g., quantitative measurements) may represent the mean start gap, mean end gap, mean overlap percentage, median start gap, median end gap, median overlap percentage, minimum and maximum start gaps/end gaps/overlap percentages, X and Y percentiles of the values, and the like for the N machine blocks. The result may be a 40x1 vector for any pair of video and corresponding subtitle file(s). A vector may be provided to machine learning models (e.g., the one or more drift detection and localization models 218 of FIG. 2A), which may determine the probability of subtitle drift occurring in the video.

At block 418, the system may generate one or more larger blocks (segments) of audio of the video (e.g., a seventh block of audio) for a determination of subtitle drift localization. To localize the drift that may be indicated by the statistics, a subtitle drift detection and localization system may repeat the process of blocks 402-416, but with the larger blocks of audio for the video. For example, a seventh block of audio for the video may be a 5 minute segment. The first and second blocks of audio at block 402 may be smaller portions of the video during the 5 minute segment, and the subtitle drift detection and localization system may generate machine blocks, map the machine blocks to human blocks, and determine whether individual segments include subtitle drift (e.g., compared to the probability of block 416 indicating whether an entire video—including multiple segments—includes subtitle drift anywhere within the video).

At block 420, the system may determine that the seventh block includes subtitle drift (e.g., based on machine learning from the test data for which the subtitle drift was introduced). The seventh block may correspond to (e.g., include) any of the 50 millisecond blocks used to determine the probability that the video includes speech/voice audio. In this manner, the system may "localize" the determination of where the subtitle drift occurs, to a level of a few minutes of granularity, to allow for mitigation.

Figure 5:
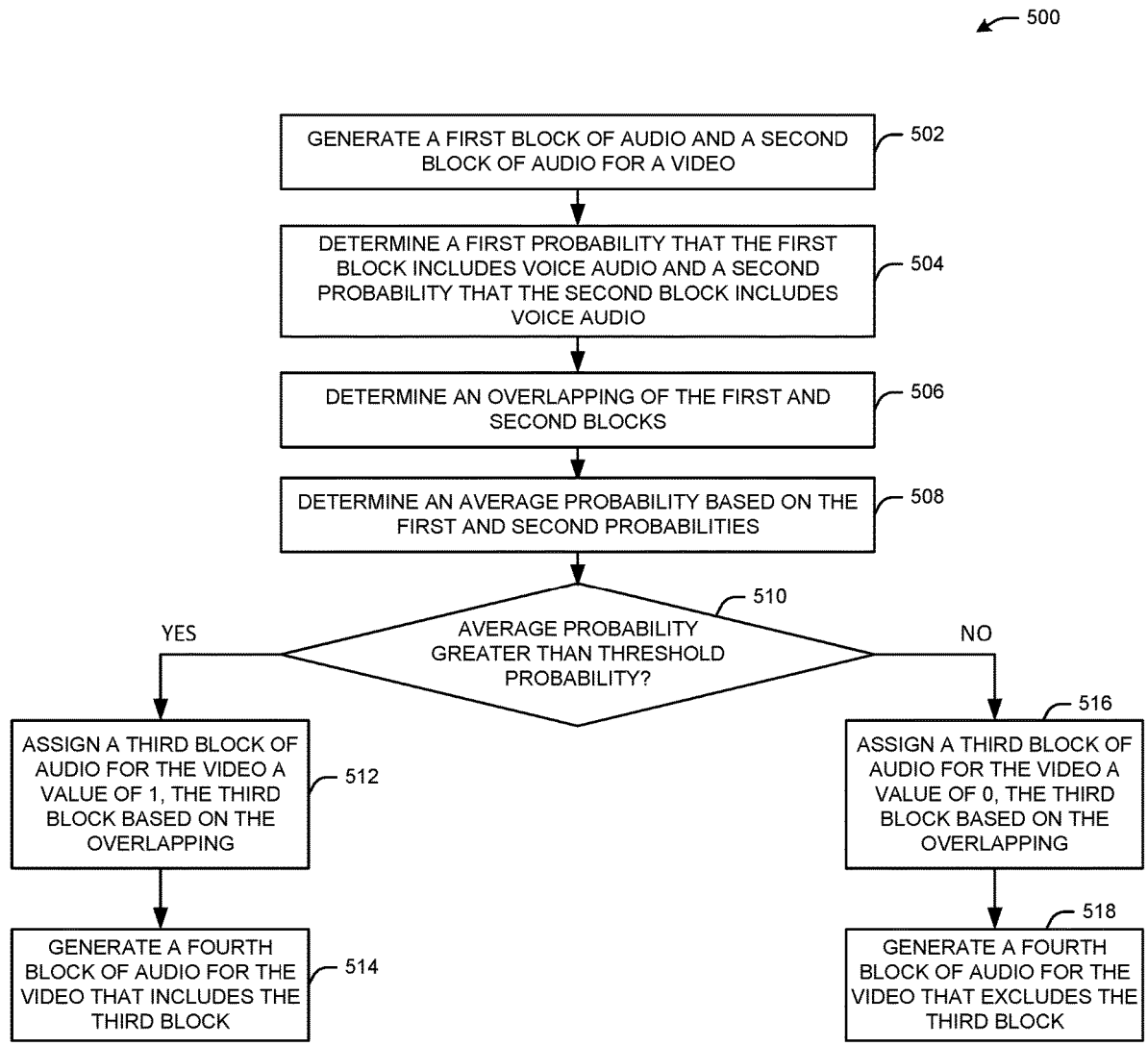
FIG. 5 illustrates a flow diagram for a process for language-agnostic subtitle drift detection and localization, in accordance with one or more example embodiments of the present disclosure.

FIG. 5 illustrates an example flow diagram for a process 500 for language-agnostic subtitle drift detection and localization, in accordance with one or more example embodiments of the present disclosure.

At block 502, a system (e.g., the system 200 of FIG. 2A) may generate blocks of audio for video, including first and second audio blocks (e.g., the 800 millisecond blocks of the video 252 shown in FIG. 2B). The system may extract audio from video sampled at a sampling frequency (e.g., 48 KHz or another frequency), and may divide the extracted audio into the audio blocks of equal length.

At block 504, the system may determine probabilities that the first and second blocks of audio for the video include audio data representative of a voice or speech. For example, for any of the blocks generated at block 502, the system may determine the probability that a block includes audio data representative of a voice or speech (e.g., a listener when listening to a block would hear someone speaking). In this manner, the system may determine a first probability that the first block includes audio data representative of a voice or speech, and may determine a second probability that the second block includes audio data representative of a voice or speech. The probability values may range from 0-1 (e.g., 0% to 100%).

At block 506, the system may determine an overlapping of the blocks generated at block 502. For example, the first block may begin at time zero (e.g., the beginning of the video to which the first block corresponds) and may have a duration of 800 milliseconds. The second block may begin at 800 milliseconds into the video to which the second block corresponds. After an incremental time, such as every 50 milliseconds, one block generated at block 502 may overlay (e.g., overlap) another block beginning at the incremental time. In this manner, the second block may overlay the first block beginning at 50 milliseconds into the video so that the first 50 milliseconds of the first block is not overlapped, the remaining 750 milliseconds of the first block is overlapped by the second block, and the final 50 milliseconds of the second block is not overlapped by the first block. Another block generated at block 502 may overlap the second block beginning at 50 milliseconds into the second block (e.g., 100 milliseconds into the first block and into the video). In this manner, the first 50 milliseconds of the second block may be overlapped only by the first block, and the remaining 750 milliseconds of the second block may be overlapped by the other block. The remaining blocks generated at block 502 may continue to overlap every 50 milliseconds in this manner, thereby resulting in the first 50 milliseconds and the last 50 milliseconds not overlapped, and the 50 millisecond blocks in between the first and last 50 milliseconds overlapped by multiple 800 millisecond blocks.

At block 508, the system may determine an average probability (e.g., for a third block of audio for the video, the average probability indicating whether speech/voice data is included in the third block) based on the first and second probabilities. The system may generate blocks of audio for the video based on the overlapping of the 800 millisecond blocks of block 506 (e.g., as explained for block 408 of FIG. 4B). For a 50 millisecond block that comes from an 800 millisecond block and is not overlapped in the overlapping, the probability that the 50 millisecond block includes audio data representative of a voice or speech may be the probability that the 800 millisecond block, of which the 50 millisecond block is a part, includes audio data representative of a voice or speech. When a 50 millisecond block is part of two or more overlapping 800 millisecond blocks, the system may determine the average probability of the probabilities for the respective 800 millisecond blocks of which the 50 millisecond block is a part, and may assign the average probability to the 50 millisecond block.

At block 510, the system may determine whether the probabilities of the 50 millisecond blocks (e.g., the average probabilities) formed by the overlapping may be compared to a threshold probability (e.g., 0.5). When a probability of a 50 millisecond block having audio data representative of a voice or speech meets or exceeds the threshold probability, the system may continue to block 512, where the system may assign the 50 millisecond block (e.g., a third block of audio for the video) a probability list value of 1, and then may continue to block 514. When a probability of a 50 millisecond block having audio data representative of a voice or speech fails to exceed the threshold probability, the system may continue to block 516, where the system may assign the 50 millisecond block (e.g., a third block of audio for the video) a probability list value of 0, and then may continue to block 518. The 0 and 1 values assigned to the 50 millisecond blocks may form a probability list (e.g., a vector) such as [0, 1, 1, 1, 0].

At block 514, the system may generate a fourth block of audio for the video, the fourth block including the third block because the third block was assigned a "1" probability value for the corresponding 50 millisecond block. Any consecutive 1 values of the probability list may be combined into a machine block with a start time corresponding to the first 1 value of the consecutive 1 values, and an end time corresponding to the last consecutive 1 value. In the example vector of [0, 1, 1, 1, 0], the "1, 1, 1," values may indicate the presence of speech/voice audio in a 50 millisecond block beginning at 50 milliseconds into a video (e.g., after the first 50 milliseconds for which there is a "0" value), the presence of speech/voice audio in a 50 millisecond block beginning at 100 milliseconds into the video (e.g., after the second 50 milliseconds, for which the value is a "1"), and the presence of speech/voice audio in a 50 millisecond block beginning at 150 milliseconds into the video (e.g., after the third 50 milliseconds, for which the value is a "1"). In this manner, the system may combine multiple consecutive 50 millisecond blocks into the fourth block.

At block 518, the system may generate the fourth block of audio for the video by excluding the third block. In the example vector of [1, 1, 0, 1, 0], the third 50 millisecond block may have a "0" probability list value, indicating that speech/voice data is not present during the 50 millisecond block. In this manner, when the system generates the fourth block, the fourth block may include one block or multiple consecutive blocks with "1" probability values, and may exclude the third block with a "0" value. The result may be the system generating machine blocks using blocks having speech/voice data, and comparing the machine blocks to corresponding human blocks (e.g., as in block 412 and block 414 of FIG. 4) to identify features that may indicate whether subtitle drift occurs in the video.

Referring to FIG. 4 and to FIG. 5, the machine blocks may be in the same language as the human blocks, or may be in different languages from one another, thereby allowing the subtitle drift recognition to be language-agnostic. For example, a machine block that maps to one or more human blocks may represent whether speech/voice audio in one language is present at a time of a video to which the audio of the machine block corresponds. The one or more human blocks may represent blocks of time for which subtitles are available to supplement the video and audio, and the subtitles may be in any language. In this manner, regardless of the language of the subtitles, the system of FIG. 4 and of FIG. 5 may be able to determine whether a voice is present in any language of the corresponding audio. Because subtitles should be available to correspond to the voice audio, the system may identify subtitle drift based on any combination of languages used for the audio and the subtitles.

The descriptions herein are not meant to be limiting.

Figure 6:
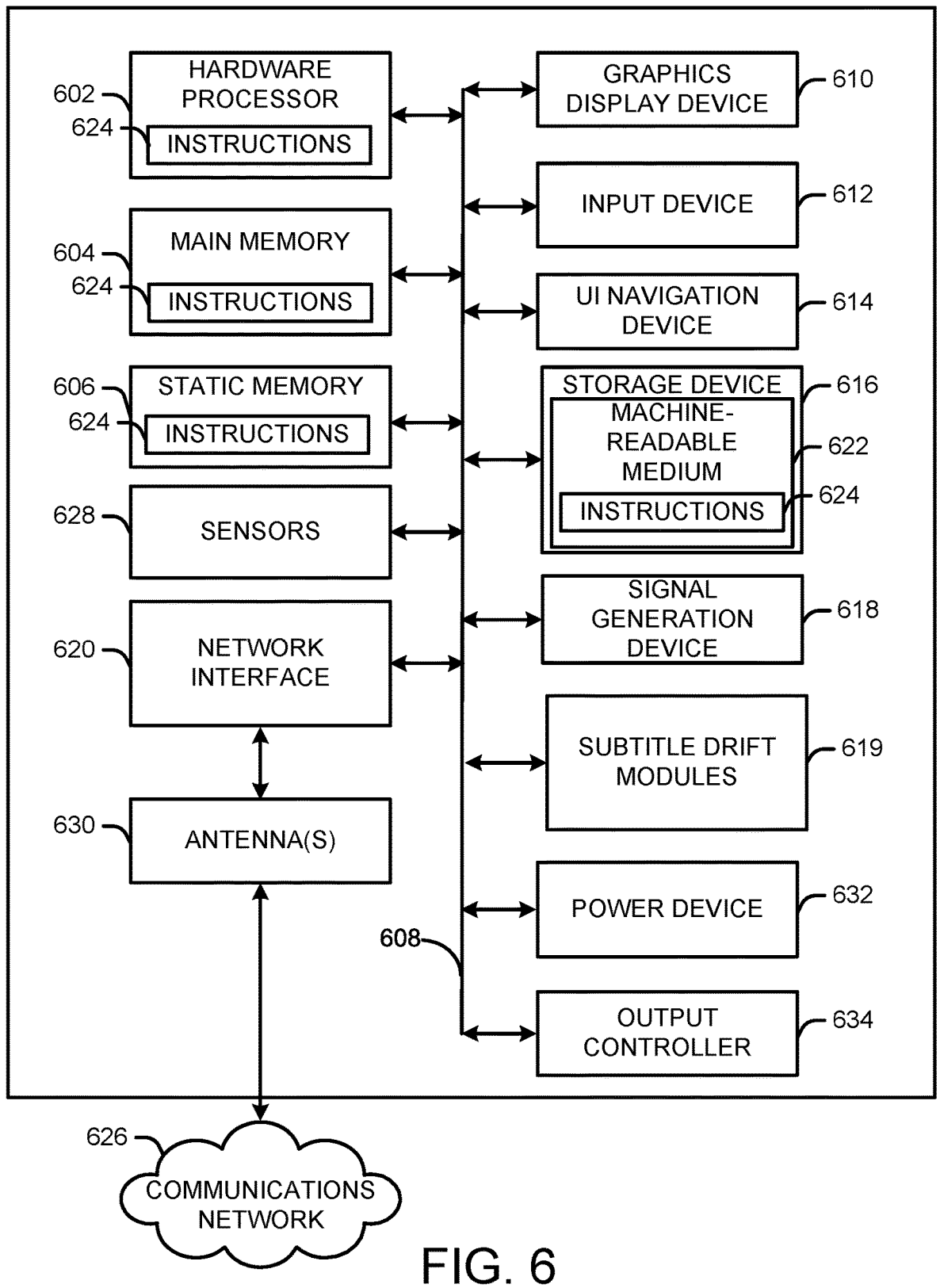
FIG. 6 illustrates a block diagram of an example machine upon which any of one or more techniques (e.g., methods) may be performed, in accordance with one or more example embodiments of the present disclosure.

FIG. 6 illustrates a block diagram of an example of a machine 600 (e.g., the device 104 of FIG. 1, the system 200 of FIG. 2Asubti) or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in Wi-Fi direct, peer-to-peer (P2P), cellular, (or other distributed) network environments. The machine 600 may be a server, a personal computer (PC), a smart home device, a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618, one or more subtitle drift modules 619 (e.g., the modules of the system 200 of FIG. 2A), a network interface device/transceiver 620 coupled to antenna(s) 630, and one or more sensors 628, such as a microphone, a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 602.11 family of standards known as Wi-Fi®, IEEE 602.16 family of standards known as WiMax®), IEEE 602.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The invention claimed is:

1. A method, comprising:
   generating, by at least one processor of a system, a first block of audio for a video and a second block of audio for the video, the first block and the second block having a first duration;
   determining, by the at least one processor, a first probability indicating that the first block includes audio data representative of a voice;
   determining, by the at least one processor, a second probability indicating that the second block includes audio data representative of a voice;
   determining, by the at least one processor, an overlapping of the first block and the second block;
   generating, by the at least one processor and based on the overlapping, a third block of audio for the video and a fourth block of audio for the video, the third block and the fourth block having a second duration less than the first duration;
   determining, by the at least one processor, a third probability indicating that the third block includes audio data representative of a voice;
   determining, by the at least one processor, a fourth probability indicating that the fourth block includes audio data representative of a voice;
   generating, by the at least one processor and based on the third probability and the fourth probability, a fifth block of audio for the video, the fifth block comprising the third block and the fourth block, and the fifth block associated with a first language;
   determining, by the at least one processor, a mapping between the fifth block and a sixth block of audio for the video, the sixth block indicating that subtitles occur between a start time of the sixth block and an end time of the sixth block, the start time of the sixth block occurring before a start time of the fifth block, the end time of the sixth block occurring before an end time of the fifth block, and the sixth block associated with a second language different than the first language;
   determining, by the at least one processor, a start gap between the start time of the sixth block and the start time of the fifth block, an end gap between the end time of the sixth block and the end time of the fifth block, and a percentage of time by which the fifth block is overlapped by the sixth block;

determining, by the at least one processor and based on the start gap, the end gap, and the percentage of time, a fifth probability indicating that the video includes subtitle drift;

generating, by the at least one processor, a seventh block of audio for the video, the seventh block comprising the first block and the second block, and the seventh block having a third duration greater than the first duration and less than a third duration of the video; and determining, by the at least one processor and based on the fifth probability and the subtitle drift associated with the seventh block, that the seventh block includes subtitle drift.

2. The method of claim 1, wherein:

the first duration is 800 milliseconds, the first 50 milliseconds of the first block is not overlapped, the 750 milliseconds of the first block subsequent to the first 50 milliseconds of the first block is at least partially overlapped by the second block, the first 50 milliseconds of the second block is overlapped only by the first block of the first blocks, the 750 milliseconds of the second block of the first blocks subsequent to the first 50 milliseconds of the second block of the first blocks is at least partially overlapped by an eighth block of audio for the video, the eighth block having the first duration, the final 50 milliseconds of the eighth block is not overlapped, and the second duration is 50 milliseconds and is based on the overlapping, further comprising:

determining a sixth probability indicating that a first 50 millisecond block of audio for the video based on the overlapping includes audio data representative of a voice;

determining a seventh probability indicating that a second 50 millisecond block of audio for the video based on the overlapping includes audio data representative of a voice;

determining an eighth probability indicating that a third 50 millisecond block of audio for the video based on the overlapping includes audio data representative of a voice;

determining a first average probability based on the sixth probability and the seventh probability; and determining a second average probability based on the seventh probability and the eighth probability, further comprising:

determining that the first average probability exceeds a threshold probability;

determining that the second average probability exceeds the threshold probability;

assigning the first 50 millisecond block a value of 1 indicating a presence of audio data representative of a voice; and assigning the second 50 millisecond block a value of 1 indicating a presence of audio data representative of a voice, wherein generating the fifth block is based on the assigning of the first 50 millisecond block a value of 1 and the assigning of the second 50 millisecond block a value of 1.

3. The method of claim 1, further comprising:

determining a gap between an end time of the third block and a start time of the fourth block; and determining, by the at least one processor, that the gap is less than a threshold amount of time, wherein generating the fifth block is based on based on the determination that the gap is less than the threshold amount of time.

4. The method of claim 1, further comprising determining, based on the start gap, the end gap, and the percentage of time, a plurality of quantitative measurements associated with the fifth block, wherein determining the fifth probability is based on the plurality of quantitative measurements.

5. A method, comprising:

generating, by at least one processor of a system, a first block of audio for a video and a second block of audio for the video, the first block and the second block having a first duration;

determining, by the at least one processor, a first probability indicating that the first block includes audio data representative of a voice;

determining, by the at least one processor, a second probability indicating that the second block includes audio data representative of a voice;

generating, by the at least one processor and based on an overlapped portion of the first block and of the second block, a third block of audio for the video and a fourth block of audio for the video, the third block and the fourth block having a second duration less than the first duration;

generating, by the at least one processor, a fifth block of audio for the video, the fifth block comprising the third block and the fourth block;

determining, by the at least one processor, a mapping between the fifth block and a sixth block of audio for the video, the sixth block indicating that subtitles occur during between a start time of the sixth block and an end time of the sixth block;

determining, by the at least one processor, a start gap between a start time of the sixth block and a start time of the fifth block, an end gap between associated with an end time of the fifth block, and a percentage of time by which the fifth block is overlapped by the sixth block;

determining, by the at least one processor and based on the start gap, the end gap, and the percentage of time, a third probability indicating that the video includes subtitle drift;

generating, by the at least one processor, a seventh block of audio for the video; and determining, by the at least one processor, that the seventh block includes subtitle drift.

6. The method of claim 5, further comprising:

determining the overlapped portion;

determining an average probability based on the first probability and the second probability;

determining that the average probability exceeds a threshold probability;

assigning the third block a value of 1; and wherein generating the fifth block is based on the assigning of the third block a value of 1.

7. The method of claim 5, further comprising:

determining the overlapped portion;

determining an average probability based on the first probability and the second probability;

determining that the average probability fails to exceed a threshold probability;

assigning an eighth block of audio for the video a value of 0, wherein:

the fifth block excludes the eighth block based on the assigning of the eighth block a value of 0.

8. The method of claim 5, further comprising:
determining a gap between an end time of the third block and a start time of the fourth block; and
determining that the gap is less than a threshold amount of time, wherein
generating the fifth block is based on based on the determination that the gap is less than the threshold amount of time.

9. The method of claim 5, further comprising determining, based on the start gap, the end gap, and the percentage of time, a plurality of quantitative measurements associated with the fifth block, wherein
determining the third probability is based on the plurality of quantitative measurements.

10. The method of claim 9, wherein the plurality of quantitative measurements comprises a mean probability based on the first probability and the second probability, a median probability based on the first probability and the second probability, a standard deviation based on the first probability and the second probability, a minimum probability based on the first probability and the second probability, and a maximum probability based on the first probability and the second probability.

11. The method of claim 9, wherein the plurality of quantitative measurements comprises a vector having forty values.

12. The method of claim 5, further comprising determining an overlapping of the first block and the second block, the overlapping comprising:
the first block, wherein the first block begins at a first time;
the second block, wherein the second block begins at a second time later than the first time and partially overlaps the first block in time; and
an eighth block of audio for the video, the eighth block having the first duration, the eighth block beginning at a third time later than the second time and partially overlapping the second block in time,
wherein the overlapping comprises the overlapped portion.

13. The method of claim 5, further comprising:
generating an eighth block of audio for the video and a ninth block of audio for the video, the seventh block comprising the eighth block and the ninth block;
generating, based on an overlapped portion of the eighth block and the ninth block, a tenth block of audio for the video and an eleventh block of audio for the video;
generating a twelfth block of audio for the video, the twelfth block comprising the tenth block and the eleventh block;
determining a mapping between the twelfth block and a thirteenth block of audio for the video, the thirteenth block indicating that subtitles occur during between a start time of the thirteenth block and an end time of the thirteenth block;
determining a second start gap between a start time of the thirteenth block and a start time of the twelfth block, a second end gap between associated with an end time of the twelfth block, and a second percentage of time by which the twelfth block is overlapped by the thirteenth block; and
determining, based on the second start gap, the second end gap, and the second percentage of time, a fourth probability indicating that the twelfth block includes subtitle drift;
wherein determining that the seventh block includes subtitle drift is based on the fourth probability.

14. The method of claim 13, wherein the twelfth block and the thirteenth block have a third duration, and the third duration is five minutes or less.

15. The method of claim 5, further comprising determining a mapping between the fifth block and an eighth block of audio for the video, the eighth block indicating that subtitles occur during between a start time of the eighth block and an end time of the eighth block, wherein the end gap is between an end time of the eighth block and the end time of the fifth block.

16. The method of claim 5, further comprising determining at least one of the start gap and the end gap is greater than zero, wherein the seventh block comprises the fifth block.

17. The method of claim 5, wherein:
the fifth block is associated with a first language,
the sixth block is associated with a second language, and
the first language is different than the second language.

18. A system, comprising memory coupled to at least one processor, the at least one processor configured to:
generate a first block of audio for a video and a second block of audio for the video, the first block and the second block having a first duration;
determine a first probability indicating that the first block includes audio data representative of a voice;
determine a second probability indicating that the second block includes audio data representative of a voice;
generate, based on an overlapped portion of the first block and of the second block, a third block of audio for the video and a fourth block of audio for the video, the third block and the fourth block having a second duration less than the first duration;
generate a fifth block of audio for the video, the fifth block comprising the third block and the fourth block;
determine a mapping between the fifth block and a sixth block of audio for the video, the sixth block indicating that subtitles occur during between a start time of the sixth block and an end time of the sixth block;
determine a start gap between a start time of the sixth block and a start time of the fifth block, an end gap between associated with an end time of the fifth block, and a percentage of time by which the fifth block is overlapped by the sixth block;
determine, based on the start gap, the end gap, and the percentage of time, a fifth probability indicating that the video includes subtitle drift;
generate a seventh block of audio for the video; and
determine that the seventh block includes subtitle drift.

19. The system of claim 18, wherein the at least one processor is further configured to:
determine the overlapped portion;
determine an average probability based on the first probability and the second probability;
determine that the average probability exceeds a threshold probability;
assign the third block a value of 1; and
wherein to generate the fifth block is based on the assigning of the third block a value of 1.

20. The system of claim 18, wherein the at least one processor is further configured to:
determine a gap between an end time of the third block and a start time of the fourth block; and
determine that the gap is less than a threshold amount of time, wherein generate the fifth block is based on based on the determination that the gap is less than the threshold amount of time.

* * * * *